United States Patent
Ko et al.

(10) Patent No.: US 9,577,924 B2
(45) Date of Patent: Feb. 21, 2017

(54) SDN-BASED NETWORK DEVICE WITH EXTENDED FUNCTION AND METHOD OF PROCESSING PACKET IN THE SAME DEVICE

(71) Applicant: ELECTRONICS AND TELECOMMUNICATIONS RESEARCH INSTITUTE, Daejeon (KR)

(72) Inventors: Nam-Seok Ko, Daejeon (KR); Sung-Kee Noh, Daejeon (KR); Jong-Dae Park, Daejeon (KR); Hwan-Jo Heo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 96 days.

(21) Appl. No.: 14/536,831

(22) Filed: Nov. 10, 2014

(65) Prior Publication Data

US 2015/0131667 A1  May 14, 2015

(30) Foreign Application Priority Data

Nov. 14, 2013 (KR) .......... 10-2013-0138660
Aug. 12, 2014 (KR) .......... 10-2014-0104472

(51) Int. Cl.
| | | |
|---|---|---|
| H04L 12/28 | (2006.01) | |
| H04L 12/721 | (2013.01) | |
| H04L 12/741 | (2013.01) | |
| H04L 12/715 | (2013.01) | |
| H04L 12/743 | (2013.01) | |

(52) U.S. Cl.
CPC .......... *H04L 45/38* (2013.01); *H04L 45/745* (2013.01); *H04L 45/64* (2013.01); *H04L 45/7453* (2013.01)

(58) Field of Classification Search
USPC .......... 370/248–255, 389–401; 709/221–229
See application file for complete search history.

(56) References Cited

U.S. PATENT DOCUMENTS

| | | | | |
|---|---|---|---|---|
| 7,315,547 B2 * | 1/2008 | Yazaki | .......... | H04L 45/00 370/389 |
| 8,605,734 B2 * | 12/2013 | Ichino | .......... | H04L 45/38 370/351 |
| 8,964,752 B2 * | 2/2015 | Zhang | .......... | H04L 45/38 370/392 |
| 8,971,338 B2 * | 3/2015 | Mishra | .......... | H04L 49/00 370/401 |

(Continued)

FOREIGN PATENT DOCUMENTS

| | | |
|---|---|---|
| KR | 10-2012-0055955 A | 6/2012 |
| KR | 10-2013-0093732 A | 8/2013 |

*Primary Examiner* — Man Phan
(74) *Attorney, Agent, or Firm* — LRK Patent Law Firm

(57) ABSTRACT

Extension of a function of an Software defined networking (SDN) network device is provided. The network device includes a plurality of flow tables, a plurality of function modules configured to perform different processing on a packet, and an entry module configured to determine an operation to be performed first on the packet between a table search operation and a function module execution operation, in which as a result of the operation determined by the entry module, a table search operation or a function module execution operation to be performed next is designated, and the designation is repeated until an output instruction for the packet is given.

12 Claims, 6 Drawing Sheets

(56) References Cited

U.S. PATENT DOCUMENTS

| | | | |
|---|---|---|---|
| 9,160,650 B2* | 10/2015 | Zhang | H04L 45/121 |
| 9,264,400 B1* | 2/2016 | Lin | H04L 63/0245 |
| 2011/0261825 A1 | 10/2011 | Ichino | |
| 2013/0163602 A1* | 6/2013 | Kang | H04L 12/56 370/400 |
| 2013/0170495 A1* | 7/2013 | Suzuki | H04L 49/3009 370/392 |
| 2013/0176850 A1 | 7/2013 | Mishra et al. | |
| 2014/0146674 A1* | 5/2014 | Wang | H04L 45/38 370/235 |
| 2015/0281036 A1* | 10/2015 | Sun | H04L 41/14 370/248 |

* cited by examiner

SDN-BASED NETWORK DEVICE WITH EXTENDED FUNCTION AND METHOD OF PROCESSING PACKET IN THE SAME DEVICE

CROSS-REFERENCE TO RELATED APPLICATION

This application claims priority to and the benefit of Korean Patent Application Nos. 10-2013-0138660, filed on Nov. 14, 2013 and 10-2014-0104472, filed on Aug. 12, 2014, the disclosures of which are incorporated herein by reference in their entirety.

BACKGROUND

1. Field of the Invention

The present invention relates to software defined networking (SDN), and more particularly, to extension of functions of an SDN network device.

2. Discussion of Related Art

Existing software defined networking (SDN) structure aims for distinct separation of the control and data plane. The data plane performs a simple function according to the rules and their actions (for example, encapsulation, decapsulation, or the like) designated by the control plane on a packet and then forwards the packet to a designated route. However, in such a structure, all the intelligence is given to the control plane and applications operating thereon. Thus, since most tasks that need intelligence, other than simple processes for packets, should be processed in the control plane, the delay issue for processing a packet and the performance issue for frequently exchanging a packet/message between the data plane and the control plane are raised.

SUMMARY OF THE INVENTION

The present invention is directed to improving an inefficient packet processing process that is caused by clear separation between a control plane and a data plane of the existing SDN structure and thus simple packet processing in the data plane.

According to an aspect of the present invention, there is provided a network device including: a plurality of flow tables; a plurality of function modules configured to perform different processing on a packet; and an entry module configured to determine an operation to be performed first on the packet between a table search operation and a function module execution operation. As a result of the operation determined by the entry module, a table search operation or a function module execution operation to be performed next is designated, and the designation is repeated until there is no operation to be performed next.

The function module may include information on an operation to be performed next after the function module is executed.

When the table search operation is performed, the operation to be performed next may be designated by an instruction included in a flow entry matched with the packet.

The instruction may be set by a controller over OpenFlow channel or a control channel for performing a similar function.

The instruction may designate one or more table searches or one or more function module executions to be performed next.

The instruction may designate, together with the function module execution operation to be performed next, another function module execution or table search to be performed subsequently to the function module execution.

The instruction may designate an operation list of a series of combinations of the table searches and the function module executions to be performed next.

When the operation determined by the entry module is the table search, a first flow table among the plurality of flow tables may be searched.

When the operation determined by the entry module is the function module execution, a first function module among the plurality of function modules may be executed.

According to another aspect of the present invention, there is provided a method of processing a packet in a network device including a plurality of flow tables, an entry module, and a plurality of function modules. The method includes: receiving a packet; determining a table search or function module execution as an operation to be performed next on the received packet by executing the entry module; processing the packet by performing the determined table search or function module execution; and post-processing the packet by performing another table search or function module execution operation that is designated as a result of the table search or the function module execution. As a result of the other table search or function module execution, still another table search or function module execution operation may be designated, and the designation is repeated until an output instruction for the packet is given.

The function module may include information on an operation to be performed next after the function module is executed.

The operation to be performed next that is designated as a result of the table search may be designated by an instruction included in a flow entry matched with the packet.

The instruction may be set by a controller over OpenFlow channel or a control channel for performing a similar function.

The instruction may designate one or more table searches or one or more function module executions to be performed next.

The instruction may designate, together with the function module execution to be performed next, another function module execution or table search to be performed subsequently to the function module execution.

The instruction may designate an operation list of a series of combinations of the table searches and the function module executions to be performed next.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
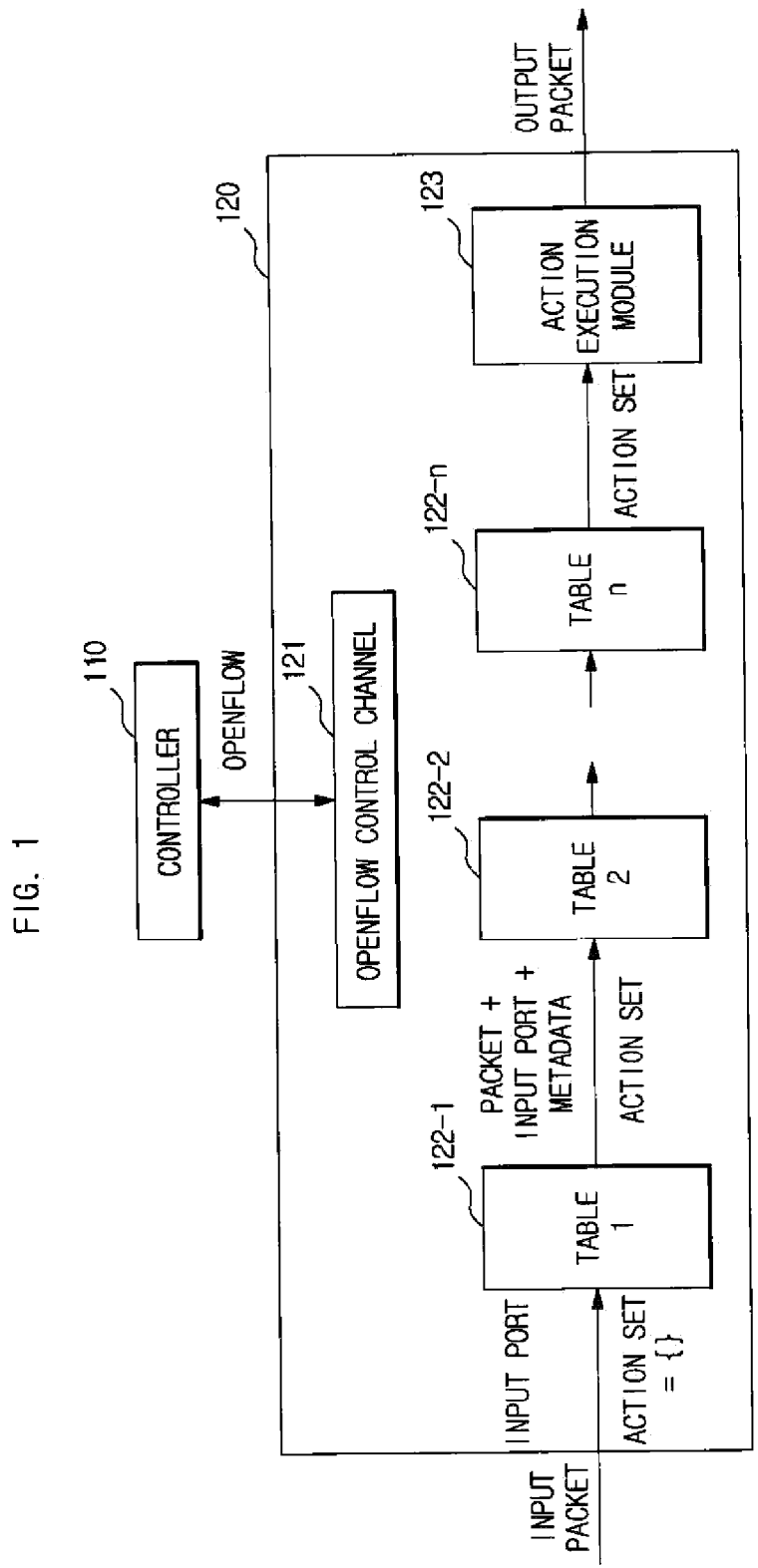
FIG. 1 shows a structure of software defined networking (SDN) based on OpenFlow.

Since the present invention may have diverse modified embodiments, preferred embodiments are illustrated in the drawings and are described in the detailed description of the invention. However, it should be understood that the particular embodiments are not intended to limit the present disclosure to specific forms, but rather the present disclosure is meant to cover all modification, similarities, and alternatives which are included in the spirit and scope of the present disclosure.

Moreover, detailed descriptions related to well-known functions or configurations will be ruled out in order not to unnecessarily obscure subject matters of the present invention.

As used herein, the singular forms "a," "an," and "the" are intended to include the plural forms as well, unless the context clearly indicates otherwise.

Moreover, as used herein, terms "module," "unit," and "interface" generally denotes a computer-related object, which may be implemented in hardware, software, or a combination thereof.

FIG. 1 shows a structure of software defined networking (SDN) based on an OpenFlow. As shown, a control plane (for example, a controller 110) and a data plane (for example, a switch 120) are separated, and the separated control plane and data plane are cooperated through OpenFlow protocol. The switch 120 may include an OpenFlow control channel 121 for communicating with the controller 110, a plurality of flow tables 122a to 122n formed in a pipeline, and an action execution module 123 for executing an action set according to a final search result of the flow tables 122a to 122n. The switch 120 searches at least one of the plurality of flow tables 122a to 122n for a flow matched with a packet input thereto and executes an action set according to a result of the search to process the packet.

Figure 2:
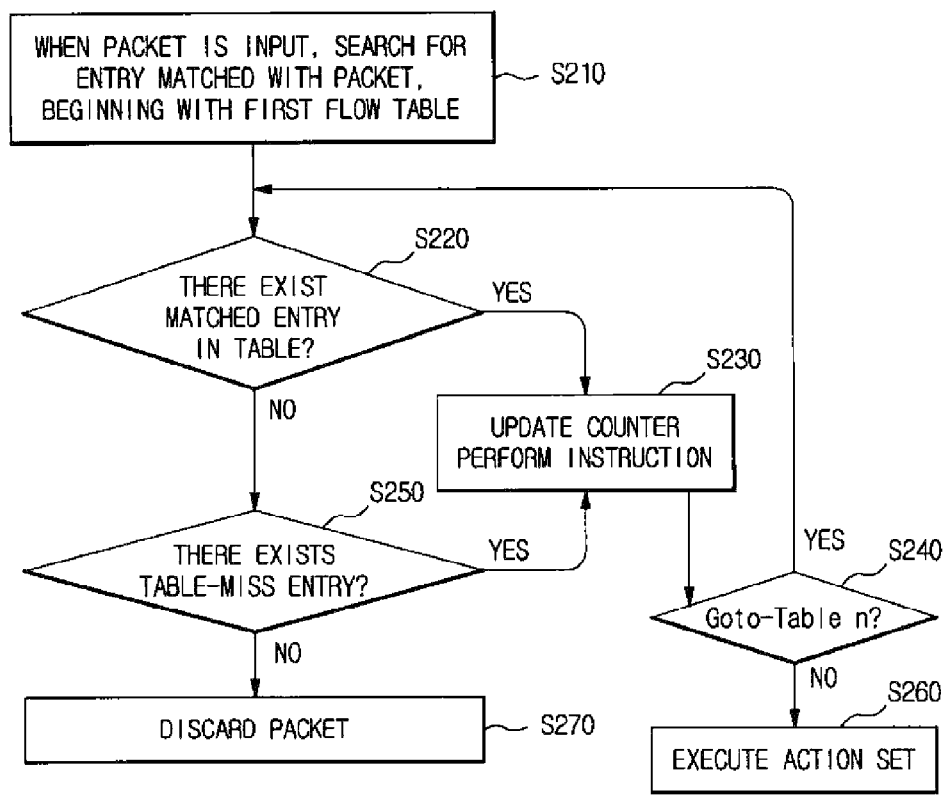
FIG. 2 is a flowchart showing a process of processing a packet by a switch of FIG. 1.

FIG. 2 is a flowchart showing a process of processing a packet by a switch of FIG. 1. When a packet is input, the switch searches for an entry matched with the packet, beginning with a first flow table in operation S210. In this case, a search key may vary depending on a definition for the table. For example, a packet header field such as an IP source address, an IP destination address, and the like and input port information may be used as the search key. The switch determines whether there exists the entry matched with the packet in operation S220, and updates a count of the entry and performs a designated instruction when there exists the matched entry in operation S230. The instruction may include an action set update, a match field update to be used in packet header information or next table search, a metadata update, etc. The switch determines whether the instruction of the matched entry includes a next table search (Goto-Table n) instruction in operation S240, and attempts the next table search when the instruction of the matched entry includes the next table search instruction. If the next table search (Goto-Table n) instruction is not given (that is, the table search is last), an action set that is finally determined until then through several table searches is performed in operation S260.

When there does not exist the matched entry through the table search, it is checked whether where exists a table miss entry (or a default entry) in operation S250. When there exists the entry, an instruction corresponding to the entry is performed in operation S230. When there does not exist the entry, the packet is discarded in operation S270.

The above-described packet processing process is described in detail in OpenFlow specification (OpenFlow Specification 1.4 official release), and thus detailed described will be omitted.

At present, the instructions currently defined in the OpenFlow specification are classified into an essential instruction and an optional instruction, and respective instructions are described in detail in the above specification. Simple description thereof is as follows.

Essential Instruction
    Goto-Table next-table-id: Request to search a table corresponding to a next table identifier (next-table-id)

Optional Instructions
    Meter meter id: Perform metering based on a defined meter identifier (meter id)
    Apply-Actions action(s): Perform an action(s)
    Clear-Actions: Clear all actions that are set in an action set
    Apply-Actions action(s): Add an action to an action set
    Write-Metadata metadata/mask: Add masked metadata to a metadata field delivered to a next table As it can be seen in the OpenFlow specification, an OpenFlow switch for performing a data plane function of SDN may search a table and also perform processing thereof, such as another table search, a specific action (output, header correction, QoS processing, discard, etc.) execution, metering application, metadata correction, etc. However, in this case, most tasks that need intelligence other than a simple task for packet processing should be performed in the control plane, thus causing a delay in the packet processing.

An SDN structure according to an embodiment of the present invention may overcome drawbacks caused by perfect separation between a control plane and a data plane in the existing SDN structure by allowing various packet processing functions to be modularized and provided to the data plane and allowing "performing of the modularized packet processing function," instead of simply changing or forwarding of a packet header, to be designated as a packet processing action for each flow in the control plane.

For example, since the current SDN structure does not provide a method of directly designating IPsec processing on a packet in an SDN data plane (an SDN switch), the SDN structure may forward the packet to a separate IPsec device (the OpenFlow switch does not perform any operation for IPsec, but instructs to forward the packet to a port connected to the IPsec device) or operate in one application of an SDN control plane. However, according to the SDN structure of the present invention, "IPsec processing function" can be defined as one modularized function and the execution of the IPsec processing module can be designated as an instruction in the entry of the flow table. Accordingly, the packet matched with the entry to the IPsec processing module can be transmitted to the IPsec processing module and IPsec processed by the module.

Here, it is assumed that the control plane and the application running on the control plane are aware that the data plane includes a function module that supports IPsec. For example, a list of function modules included in the data plane may be checked through OF-CONFIG extension. In addition, when a data plane chipset is supported, the data plane may dynamically download and install a needed function module. As such, the control plane and the application operating thereon may implement various packet processing functions by programming function modules that are supported by the data plane.

The SDN structure according to an embodiment of the present invention will be described below in more detail with reference to FIGS. 3 to 5.

Figure 3:
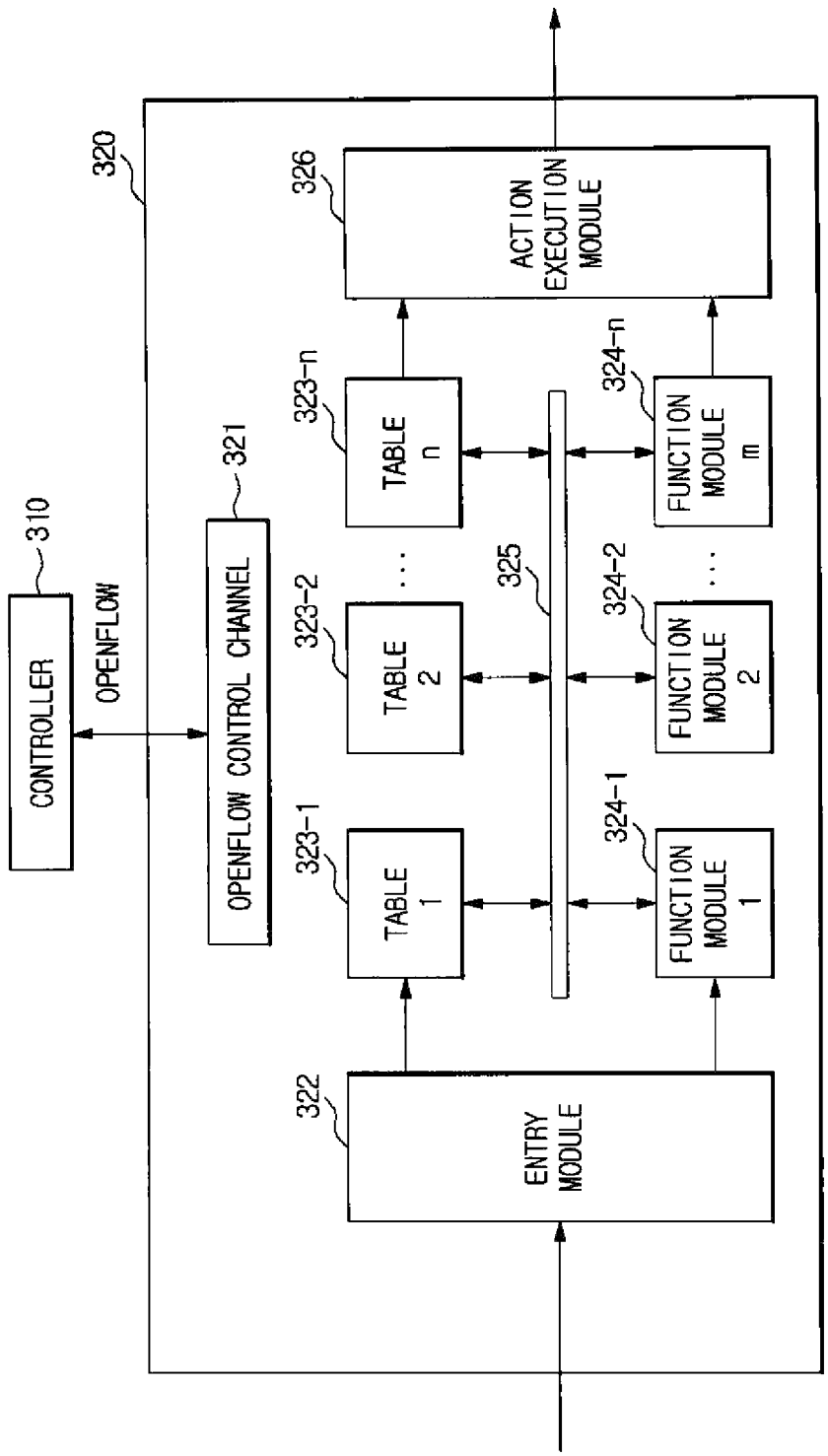
FIG. 3 conceptually shows a structure of an SDN network device according to an embodiment of the present invention.

FIG. 3 conceptually shows a structure of an SDN network device according to an embodiment of the present invention.

As shown, the SDN structure proposed in the present invention is also divided into a controller 310 corresponding to the control plane and a network device (for example, a switch 320) corresponding to the data plane. A configuration in which the controller 310 and the network device 320 communicate with each other through a protocol such as OpenFlow is the same as the conventional configuration. However, the network device 320 according to an embodiment of the present invention is characterized to perform in addition to a plurality of flow tables to include an entry module and a plurality of function modules.

Specifically, the network device 320 according to an embodiment of the present invention may include a plurality of flow tables 323-*l* to 323-*n*, a plurality of function modules 324-*l* to 324-*n*, and an action execution module 326 that are mutually connected through an OpenFlow control channel 321, an entry module 322, and a communication channel 325.

The entry module 322 is a kind of function module and determines whether a next operation is a table search or a function module execution by performing basic processing on an input packet. According to the determination of the entry module 322, a first table 323*a* may be searched, or a first function module 324*a* may be executed.

Each of the flow tables 323-*l* to 323-*n* is a table that defines a processing operation for each flow. In an embodiment, the flow tables 323-*l* to 323-*n* may include an instruction for designating another table search and/or function module execution in the flow entry.

In an embodiment, the instruction may be set by the controller over an OpenFlow channel.

In an embodiment, the instruction may designate one or more table searches or one or more function module executions that are to be performed next. For example, the instruction may be in the form of "an n-th table search (Goto-Table n)" or "an m-th function module execution (Run-Function m)."

In another embodiment, together with the function module execution to be performed next, the instruction may designate another function module execution or table search to be performed subsequently to the function module execution. For example, the instruction may be in the form of "Run-Function x before Goto-Table n" or "Run-Function x before Run-Function y."

In still another embodiment, the instruction may designate an operation list of a series of combinations of the table searches and the function module executions to be performed next. For example, the instruction may be in the form of "Run-Function 1->Goto-Table 1->Run-Function 2->Run-Function 3->Goto-Table 2."

Each of the function modules 324-*l* to 324-*n* may perform various functions related to packet processing. The function module may perform a simple function of supporting the table search in addition to a complicated function such as packet header change, IPsec, Deep Packet Instruction (DPI), and load balancing. The SDN structure according to an embodiment of the present invention may differentiate respective network devices according to which function is added when an SDN data plane (for example, a network device such as an SDN switch) is developed. According to an embodiment of the present invention, an intelligent SDN switch, which may enable efficient packet processing while breaking a concept of an existing dummy switch for simply manipulating and forwarding a packet and maintaining a basic concept (a structure in which most intelligence is put in the SDN control plane) of an existing SDN, may be implemented.

In an embodiment, each of the function modules 324-*l* to 324-*n* may include operation information to be performed after the function module is executed. The function module may include information about a single or a plurality of table searches or a single or a plurality of function module executions as an operation to be performed next.

The function modules 324-*l* to 324-*n* may be implemented in hardware within a switch chipset or implemented as a software module that may be dynamically installed. For example, the function module that is implemented in software may be dynamically loaded to a number of independent processing units that may be programmed in a switch chipset or dynamically loaded to a separate external processing unit connected with the switch chipset through an external interface to perform a certain function. The present invention is not limited to physical positions and specific implementations of the function modules and is configured with respect to a cooperative structure and operation in which one function module is linked with one or more table searches and/or different function module executions.

In an embodiment, the function modules 324-*l* to 324-*n* may be controlled (including control of information on the operation to be performed after the function module execution) by extending OpenFlow protocol or through a separate interface. In addition, in order to allowing a differentiated function of a chipset for each switch chipset vendor to be used, an easily usable API may be provided to facilitate control of the function module in the control plane and the application.

Figure 4:
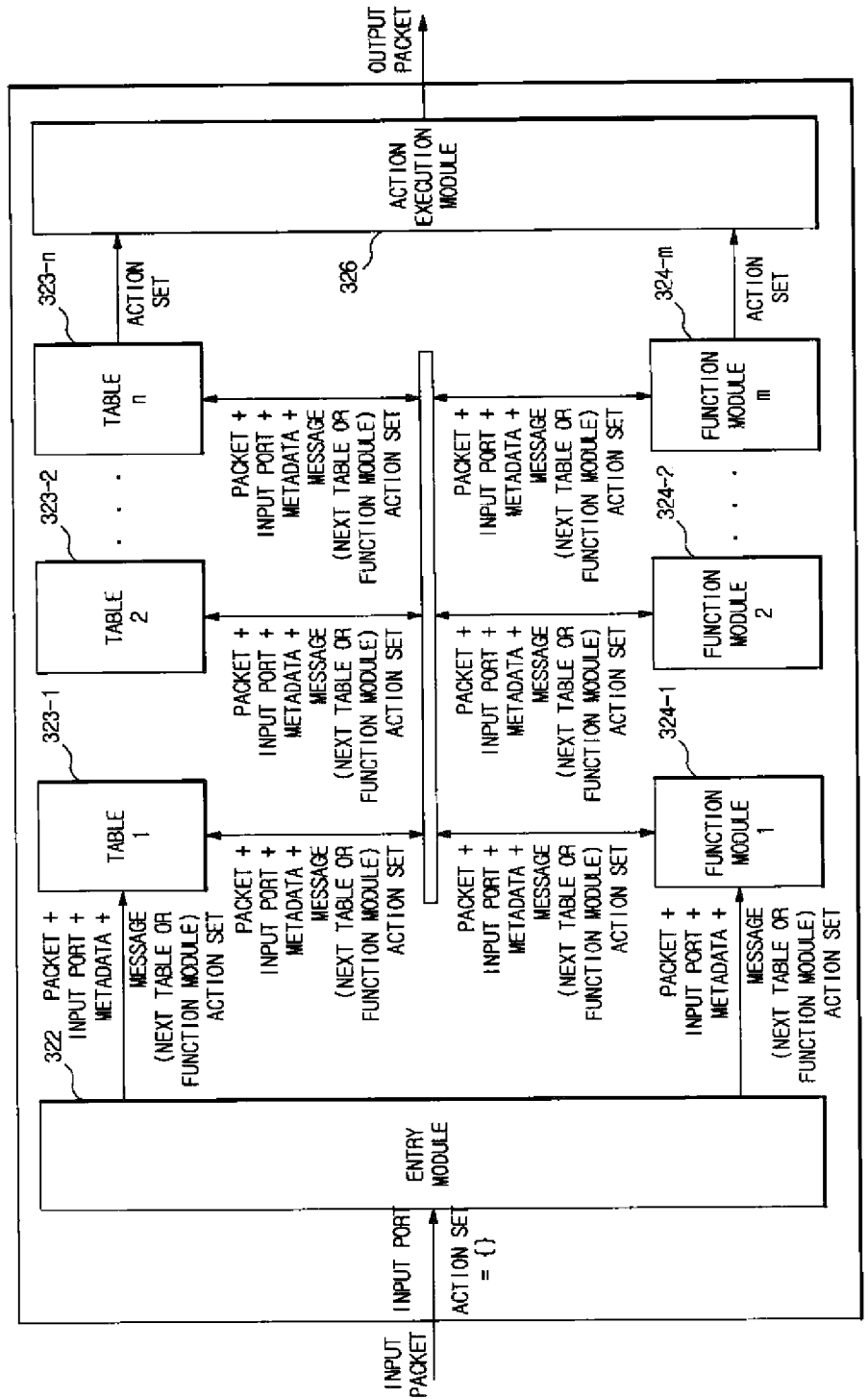
FIG. 4 shows a structure in which information is delivered between a plurality of tables and a plurality of function modules that are shown in FIG. 3.

FIG. 4 shows a structure in which information is delivered between a plurality of tables and a plurality of function modules that are shown in FIG. 3.

When a packet is received, the entry module 322 is first performed. The entry module 322 determines whether to perform, as a next operation, the table search or the function module execution by performing basic processing on an input packet.

As a result of the table search or function module execution determined by the entry module 322, an operation to be performed next, that is, a different table search or function module execution may be designated. The designation of an operation to be performed next will be repeated until an instruction for outputting the packet is given. That is, the designation of an operation to be performed next is repeated until the table search or function module execution is not required anymore. The packet processing is completed by performing a final action set resulting from the last table search or function module execution.

In an embodiment, when an instruction for designating another table search or function module execution is not designated as a result of the table search or function module execution, a default instruction may be performed. When the instruction is not designated as a result of the table search or function module execution and there is no default instruction either, the corresponding packet may be discarded.

In an embodiment, the instruction determined as a result of the table search or function module execution may be an instruction for designating a single table search or function module execution or an instruction for requiring a series of a plurality of table searches or function module executions. That is, one instruction is a series of combination instructions for designating all table searches and/or function module executions that should be achieved before a packet is transmitted to an output port, and may allow the table search/function module execution to be performed sequentially in a designated order. In the present invention, such processing is referred to as a "source routed function" processing.

Referring again to FIG. 4, an example of information to be transmitted over the communication channel 325 between tables, between function modules, or between a table and a function module is shown. As shown, the information transmitted between tables, between function modules, or between a table and a function module may basically include information shown in FIG. 2, that is, a packet, input port information, metadata, and an action set, and additionally include a message field as characteristic information according to an embodiment of the present invention. The present invention may deliver an instruction (Next Table or Function) for designating a next operation (or list of operations) to be performed next as a result of the operation (table search or function module execution) that is being currently performed using the message field. That is, an instruction for designating a single table search or function module execution or a series of combinations of a plurality of table searches or function module executions may be delivered.

Figure 5:
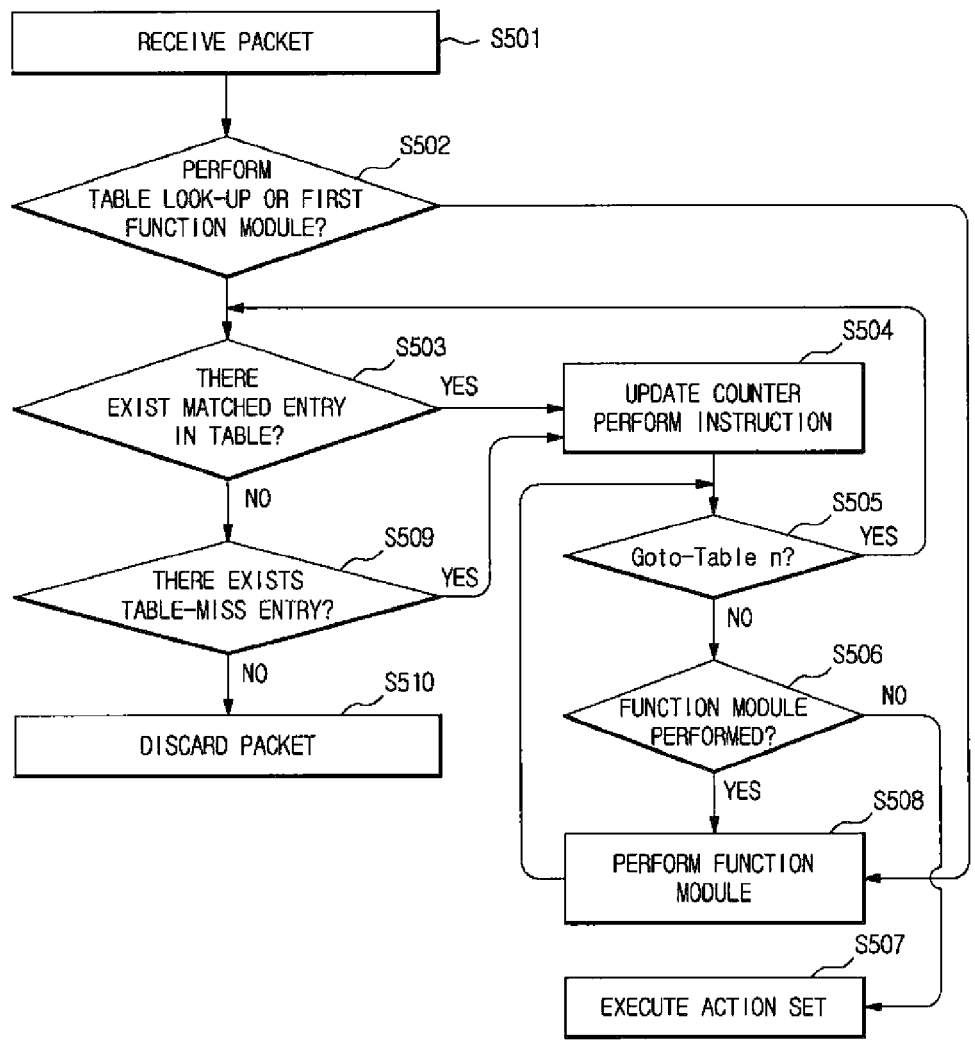
FIG. 5 is a flowchart showing a packet processing process performed by a network device according to an embodiment of the present invention.

FIG. 5 is a flowchart showing a packet processing process performed by a network device according to an embodiment of the present invention.

As shown, when a packet is received in operation S501, the process determines whether a next operation is a table search or function module execution by executing an entry module for performing a basic processing on the packet in operation S502.

When the next operation is determined to be the table search, the process performs a first table search to check whether there exists an entry matched with the corresponding table in operation S503. When there exists the matched entry, the process updates count information for the corresponding entry, and performs an action set update, a match field update that may be used in packet header information or in a next table search, a metadata update that may be used to communicate information between tables and also used for the next table search in operation S504. When there does not exist the matched entry, the process may determine whether there exists a table-miss entry (or a default entry) in operation S509, perform an instruction designated for the corresponding entry when there exists the default entry in operation S504, and discard the corresponding packet when there does not exist the default entry in operation S510.

When the next operation is determined to be the function module execution in operation S502, a first function module execution is performed in operation S508, and an action set update, a packet header information/match field update, a metadata update, and the like may be achieved as processing of the packet in operation S504.

When a "next table search (Goto-Table n) instruction" is given as a result of the table search or function module execution, the process searches the next table (S505->S503). When a "function module execution (Run-Function m) instruction" is given, the process executes a "function module" designated in the instruction (S506->S507). As a result of the table search or function module execution, another table search or function module execution may be designated, and a series of table searches and/or function module executions are performed to process the packet until a packet output instruction is finally given.

When the table search or function module execution is determined not to be designated anymore after a series of table searches and function module executions are performed through the above process, an action set that is set until then through table search and function module execution is performed.

In an embodiment, next table information or next function module information that is given after the function module is executed may be included in the function module or may be included in a message that is transmitted together with a "function module execution instruction" which is given as a result of a previous table search.

In addition, a series of table information and other function module information to be used to perform a specific function module execution and perform search after the specific function module execution may be designated as a result of one table search or function module execution. As an implementation example in which a series of table searches and function module executions may be designated at once, an OpenFlow addition instruction may be defined in the form of "Run-Function x before Goto-Table n" and "Run-Function x before Run-Function y." For example, "Run-Function x before Goto-Table n" denotes to perform a function module x and then search a table n. In an actual command execution, the function module x according to "Run-Function x" is executed, and "Goto-Table n" is delivered to the function module x in the form of the message. The function module x performs a "Goto-Table n" instruction after processing the packet.

As another example, "Run-Function x before Run-Function y" denotes to execute the function module x and then the function module y. The function module x according to "Run-Function x" is first executed. "Run-Function y" is delivered to the function module x in the form of the message. Thus, the function module x performs the "Run-Function y" instruction after processing the packet. In addition, the "Run-Function y" instruction may be extended to an instruction in the form of "Run-Function x before Goto-Table n" and "Run-Function x before Run Function y" by combining the table search information or the function module information after performing the function module y.

In the above-described example, an instruction for designating a function module execution and also only a table search or another function module execution immediately after the function module execution has been described. However, according to another embodiment of the present invention, a list of several continuous instructions is also possible. For example, the instruction may be extended in the form of an instruction list for designating a plurality of operations such as "Run-Function 1->Goto-Table 1->Run-Function 2->Run-Function 3->Goto-Table 2." The instruction list indicates to execute Function module 1 and then search Table 1 and continuously execute Function modules 2 and 3 and then search Table 2.

As such, the instruction list is only one example of the present invention. As a result of any table search, any table information to be searched next, a table list to be used for continuous searches, a function module, a function module list, or another form of instruction for accomplishing an objective with the intention of performing a combination list of a table search and a function module execution.

In order to allow instruction such as "Run-Function x before Goto-Table n" and "Run-Function x before Run-Function y" or instruction list such as "Run-Function 1->Goto-Table 1->Run-Function 2->Run-Function 3->Goto-Table 2" to be designated as an instruction of a flow table entry in the data plane according to an embodiment of the present invention, the SDN control plane should be able to check in advance a set of function modules that are implemented in the SND data plane. This is possible because of information exchange between the SDN data plane and the control plane through a separate independent protocol or OF-Config defined in Open Networking Forum (ONF), like OpenFlow. The present invention does not limit the method of the SDN control plane acquiring function module information of the data plane.

Figure 6:
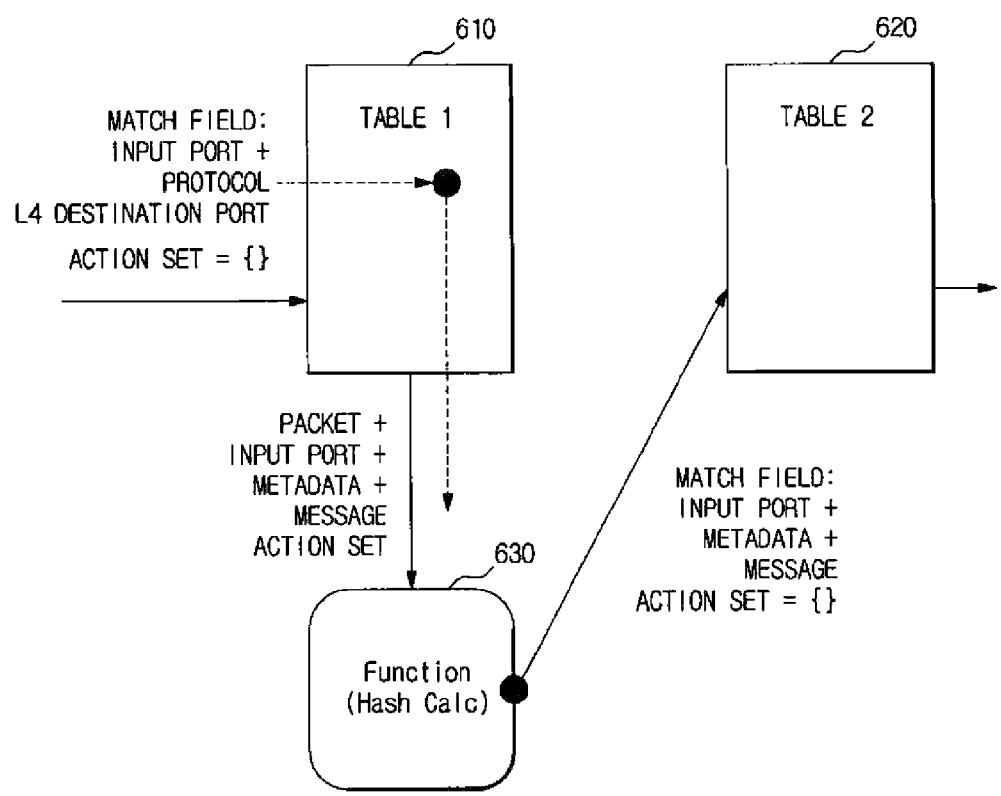
FIG. 6 shows an example of cooperation between function modules and table searches in a network device according to an embodiment of the present invention.

FIG. 6 shows an example of cooperation between function modules and table searches in a network device according to an embodiment of the present invention. As shown, in a table structure including two tables, that is, a first table (Table 1) 610 and a second table (Table 2) 620, it is assumed that the first table (Table 1) 610 is a flow table (for example, a flow table having as a match field an input port number and a four-layer (TCP or UDP) destination port number) having a great granularity of a flow, and the second table (Table 2) 620 is a micro flow hash table (5-tuple, that is, hash values of an IP source address, an IP destination address, a protocol number, a TCP or UDP source port number, and a TCP or UDP destination port number). In order to process a packet, if a network device according to an embodiment of the present invention desires to search the first table (Table 1) 610 and then the second table (Table 2) 620 that is configured with the micro flow using the hash values for 5-tuple so as to obtain information on a final output port, the hash values for 5-tuple may be needed as a key for searching the second table. In an embodiment of the present invention, an operation of extracting each hash value may be defined using one function module 630. The hash value extracted by executing the function module 630 may be delivered through a metadata field when delivering information for searching the second table 620.

According to an embodiment of the present invention, it is possible to enable the network device to perform a variety of more intelligent functions while conforming to an existing SDN concept that allows programming to the network device (for example, an SDN switch). The present invention may efficiently improve a delay problem of the SDN switch and the SDN control period, which are pointed out as drawbacks of the existing SDN structure, and may differentiate functions of the SDN switch for each manufacturer.

The above described embodiments of the present invention may be implemented as program instructions executable by a variety of computers and recorded on a computer-readable medium. The computer-readable medium may include a program instruction, a data file, a data structure, or a combination thereof.

The program instructions recorded on the computer-readable medium may be designed and configured specifically for the present invention or can be publicly known and available to those who are skilled in the field of computer software. Examples of the computer-readable recording medium include a magnetic medium, such as a hard disk, a floppy disk, and a magnetic tape, an optical medium, such as a CD-ROM, a DVD, etc., a magneto-optical medium such as a floptical disk, and a hardware device specially configured to store and perform program instructions, for example, a ROM, RAM, flash memory, etc. In addition, the computer-readable recording medium may be a transmission medium such as an optical or metallic line or a waveguide, including a carrier for transmitting signals to indicate program instructions, a data structure, etc. Examples of the program instructions include machine codes made by, for example, a compiler, as well as high-level language codes executable by a computer, using an interpreter.

The above exemplary hardware device can be configured to operate as one or more software modules in order to perform the operation of the present invention, and vice versa.

This invention has been particularly shown and described with reference to preferred embodiments thereof. It will be understood by those skilled in the art that various changes in form and details may be made therein without departing from the spirit and scope of the invention as defined by the appended claims. Accordingly, the referred embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. A network device comprising:
a plurality of flow tables and a plurality of function modules, executed by a processor, using algorithm, which when executed, causing the processor to search at least one of the flow tables to determine whether a flow entry in the at least one of the flow tables is matched with an input packet and to execute at least one of the function modules to perform least one of various functions, other than searching the at least one of the flow tables, related to packet processing on the input packet; and
an entry module executed by the processor, using algorithm, which when executed, configured to determine which operation, between a flow table search operation searching the at least one of the flow tables and a function module execution operation executing the at least one of the function modules, is to be performed first when the input packet is received,
wherein, in response to a result of the operation determined by the entry module, the processor is configured to designate a next operation until there is no operation to be performed on the received input packet, the next operation being the flow table search operation or the function module execution operation,
wherein when the flow table search operation is performed, the operation to be performed next is designated by an instruction included in the flow entry matched with the input packet, and
wherein the instruction designates, together with the function module execution operation to be performed next, another function module execution operation or flow table search operation to be performed subsequent to the function module execution operation.

2. The network device of claim 1 wherein the function module includes information of an operation to be performed next after the function module is executed.

3. The network device of claim 1, wherein the instruction is set by a controller over OpenFlow channel or a control channel for performing a similar function.

4. The network device of claim 1, wherein the instruction designates one or more flow table search operations or one or more function module execution operations to be performed next.

5. The network device of claim 1, wherein the instruction designates an operation list of a series of combinations of flow table search operations and function module execution operations to be performed next.

6. The network device of claim 1 wherein, when the operation determined by the entry module is the flow table search operation, a first flow table among the plurality of flow tables is searched.

7. The network device of claim 1, wherein, when the operation determined by the entry module is the function module execution operation, a first function module among the plurality of function modules is executed.

8. A method of processing an input packet in a network device including a plurality of flow tables, an entry module, and a plurality of function modules, the method comprising:
receiving the input packet;
determining a flow table search operation searching at least one of the flow tables or function module execution operation a s an or ration to be performed first on the received input packet by executing the entry module, wherein the function module execution operation is for executing at least one of the function modules to perform at least one of various functions, other than searching the at least one of the flow tables, related to packet processing on the input packet;
processing the input packet by performing the determined flow table search operation or function module execution operation; and
processing the input packet subsequently by performing another flow table search operation or another function module execution operation that is designated as a result of the flow table search operation or the function module execution operation,
wherein as a result of the other table search operation or function module execution operation, still another table search or function module execution operation is designated, and the designation is repeated until an output instruction for the packet is presented,
wherein the operation to be performed next that is designated as a result of the flow table search operation is designated by an instruction included in a flow entry matched with the input packet and
wherein the instructions designates, together with the function module execution operation to be performed next, another function module execution operation or flow table search operation to be performed subsequent to the function module execution.

9. The method of claim 8, wherein the function module includes information of an operation to be performed next after the function module is executed.

10. The method of claim 8, wherein the instruction is set by a controller over OpenFlow channel or a control channel for performing a similar function.

11. The method of claim 8, wherein the instruction designates one or more flow table search operations or one or more function module execution operations to be performed next.

12. The method of claim 8, wherein the instruction designates an operation list of a series of combinations of flow table search operations and function module execution operations to be performed next.

* * * * *